Sept. 5, 1967  W. E. FOX  3,339,762
BOAT TRAILER
Filed Oct. 18, 1965  2 Sheets-Sheet 2

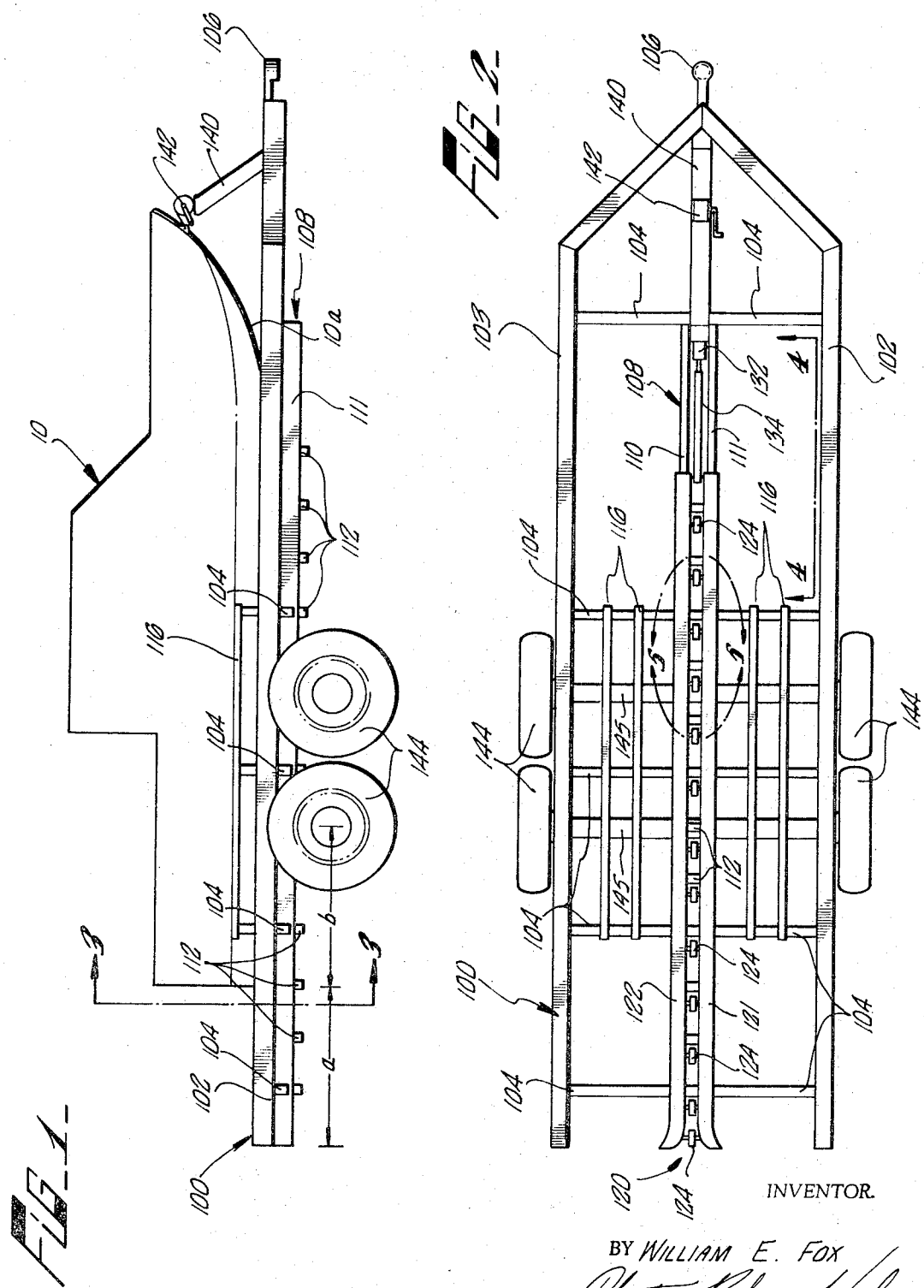

INVENTOR.
WILLIAM E. FOX
BY Christie, Parker & Hale
ATTORNEYS

United States Patent Office 3,339,762
Patented Sept. 5, 1967

3,339,762
BOAT TRAILER
William E. Fox, 874 Highland Drive,
Flintridge, Calif.
Filed Oct. 18, 1965, Ser. No. 497,100
7 Claims. (Cl. 214—84)

This invention relates to trailers for towing boats and more particularly to an improvement in boat trailers.

Trailers are commonly used for hauling small boats, however, these trailers are unsuitable for transporting large heavy boats. Trailers are made for hauling large heavy boats, however, it is difficult to load the large heavy boats on these trailers. Due to the difficulty of loading and unloading large heavy boats, they are seldom transported about as is common with smaller boats.

In contrast, an embodiment of the present invention is directed to an improved boat trailer which readily transports boats weighing in the order of 2½ tons and 21 ft. in length. Such a trailer also allows a heavy boat to be loaded and unloaded with the ease that smaller boats are now loaded and unloaded. When placed on an inclined ramp, actuation of a jack causes the boat to actually roll off of the trailer because of its own weight. When loading the boat, the boat may be driven directly on the trailer. In addition, such a trailer is easily loaded without putting its wheel bearings in water.

Briefly, an embodiment of the present invention comprises a trailer for a boat having a rigid frame having front and back ends and sides including a central support structure in between the sides in the frame. An elongated keel support structure extends along the central support structure. The said keel support structure includes a pair of rigid guides extending upward along the length thereof and spaced apart to permit a keel member of a boat mounted in the trailer to extend therein. A series of rollers are connected in between the guides on which such keel member rolls and are positioned with the outer periphery thereof below the upper side of the guides to allow the keel member to be guided by the guides. A plurality of substantially parallel rocker members are rotatably connected between the keel support structure and the central support structure. Means is connected between the frame and the keel support structure for moving the keel support structure along the central support structure causing the rocker members to rotate and lift the boat in the trailer and allow it to roll along the rollers off the back end of the frame.

These and other features of the present invention may be more fully understood with reference to the following figures, of which:

FIG. 1 is a side elevation view of a boat trailer with a boat mounted therein and embodying the present invention;

FIG. 2 is a top elevation view of the boat trailer shown in FIG. 1 with the boat removed;

Refer now to the boat trailer shown in FIGS. 1 through 5. The boat trailer 100 is shown with a boat 10 mounted therein in FIGS. 1, 2, 3 and 4. The boat trailer 100 has a rigid frame having side members 102 and 103 running the length thereof. The side members 102 and 103 are parallel except at the front end of the trailer where they come together in a V shaped configuration. A conventional trailer hitch 106 is connected at the front end of the trailer for coupling to a conventional ball joint connected on a vehicle for towing the trailer.

Figure 3:
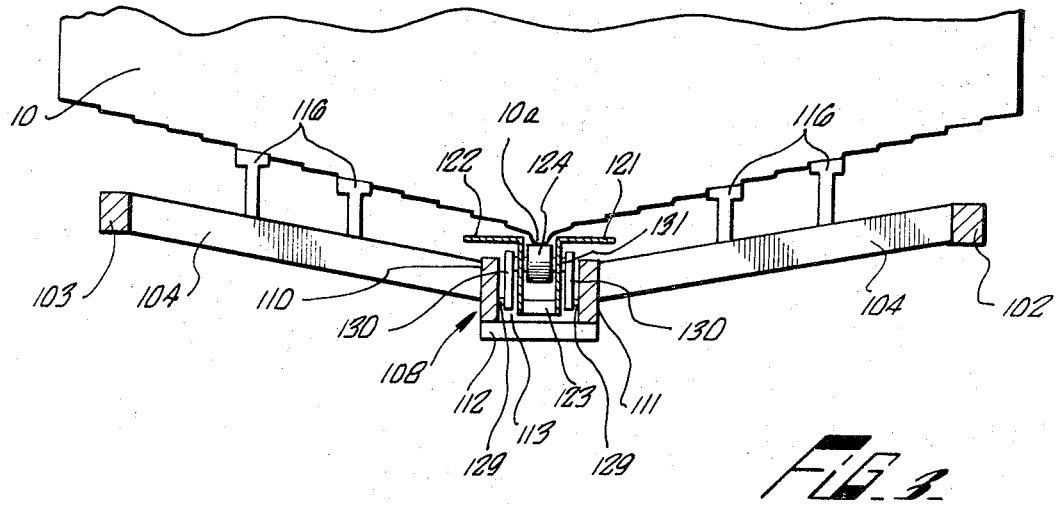
FIG. 3 is an enlarged view of the trailer and boat shown in FIG. 1 taken along the lines 3—3. The wheels and structure connecting the wheels to the rest of the trailer are not shown.

A central support structure 108 extends along the center of the frame in between the sides 102 and 103. The central support structure 108 includes a pair of rigid side members 110 and 111 which are spaced apart and connected together at the bottom thereof by cross members 112. The cross members 112 are spaced along the length of the members 110 and 111. The members 110, 111 and 112 are rigidly connected together by welding or by other well known means. The members 110 and 111 are spaced apart and form a recess 113 therein into which a keel support structure 120 extends. The recess 113 is best seen in FIG. 3.

The central support structure 108 is rigidly connected into the frame of the trailer by cross members 104 which extend in towards the center from the side members 102 and 103. The cross members 104 are rigidly connected to the side members 110 and 111 of the central support structure 108 by welding or other well known means to form a rigid structure.

Four pads are connected to the cross members 104 and engage the bottom of the boat 10 mounted in the trailer.

The keel support structure 120 has a pair of guide members 121 and 122 mounted in the recess 113 and extending in a vertical direction up out of the recess 113. The guide members 121 and 122 flare out at the top. The guide members 121 and 122 are rigidly connected together at the lower end thereof by cross members 123 which are welded at spaced positions along the length of the members 121 and 122. A plurality of rollers 124 are connected in between the side members 121 and 122 of the keel support structure 120.

The boat 10 is provided with a metal strip 10a which extends along the keel line of the boat from the bow to the stern. The metal strip 10a is a half round metal strip which extends down in between the side members 121 and 122 of the keel support structure 120 when the boat 10 is mounted in the trailer. The rollers 124 are positioned with the outer periphery thereof down from the upper surfaces of the guide members 121 and 122 so that the metal strip 10a may extend down in between the guide members 121 and 122 and may be guided thereby. With this structure, the side members 121 and 122 guide the boat 10 in a straight line in the trailer during loading and unloading.

A plurality of rocker arms 130 are rotatably connected in between the side member 111 and the corresponding guide member 121 of the central support structure 108. The rocker arms 130 between the members 121 and 111 are readily seen in FIG. 4. Similarly, rocker arms 130 are connected between the side member 110 and the guide member 122. The rocker arms 130 are arranged in pairs with one pair at each roller 124 except for the last roller 124 at the back end of the trailer. The upper end of each pair of rocker arms 130 is rotatably connected by a shaft 130 to the guide members 121 and 122. Each shaft 131 passes clear through both guide members 121 and 122. The rollers 124 are mounted on the same shaft 130 as the corresponding pair of rocker arms 130. The lower end of each pair of rocker arms 130 are rotatably connected to the side members 110 and 111 by shafts 129.

Figure 4:
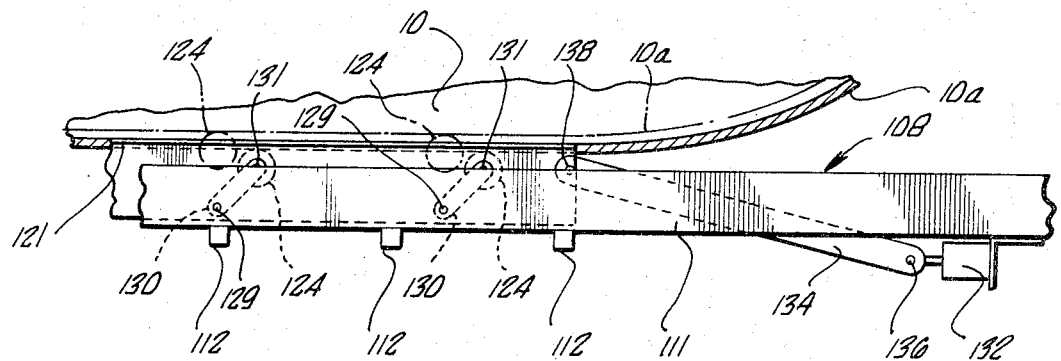
FIG. 4 shows an enlarged view of a portion of the boat and a portion of the trailer taken along the lines 4—4 of FIG. 2.
Figure 5:
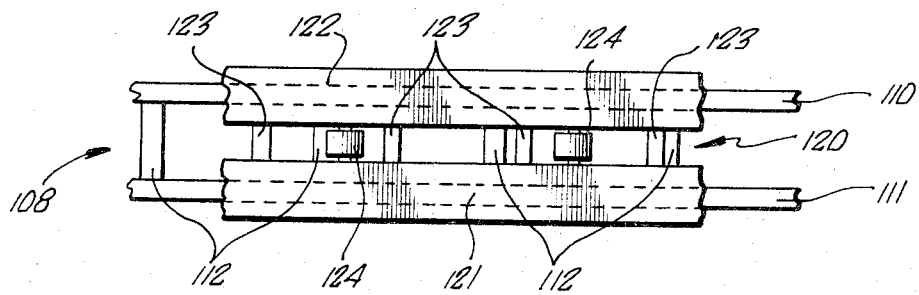
FIG. 5 is an enlarged view of the keel support structure and the central support structure of the boat trailer taken along the lines 5—5 of FIG. 2.

When boat 10 is mounted in the trailer and being transported, the keel support structure 120 is in a forward position as indicated in FIG. 4, with the rocker arms 130 at a slight angle pointing towards the front of the boat. When it is desired to launch the boat the keel support structure 120 is moved in a horizontal direction towards the rear of the boat causing the rocker arms 130 to rotate so that the rollers 124 move backward and upward engaging and raising the metal strip 10a and thereby moving the boat 10 in an upward direction. Movement of the boat in an upward direction raises the boat 10 off of the pads 116 and allowing the boat 10 to roll along the rollers 124 off of the trailer.

A hydraulic jack 132 is rigidly connected to the bottom of the side members 110 and 111. A connecting member 134 is rotatably connected between the guide members 121 and 122 and the jack 132 by means of connecting pins 136 and 138. The connecting member 134 is oriented parallel with the length of the trailer and parallel with the keel support structure. Also the jack is oriented so that actuation thereof causes movement of the connecting member parallel with the length of the boat in a fore and aft direction.

A member 140 extends up from the frame of the boat in a vertical direction. A winch 142 is mounted on the member 140 and is used for loading the boat 10.

Preferably, the trailer is a tandem type of trailer having two wheels 144 on each side, on which the frame of the trailer is mounted. The wheels 144 are mounted on axles 145 which in turn are connected to the frame of the trailer in any one of a number of well known manners. Such structure is common in trailers and the details thereof are not given nor need to be given for a complete understanding of the present invention.

In a preferred embodiment of the invention the trailer including the keel support structure 120 is of such a length that the distance between the center of the rear wheel and the stern of the boat is approximately the same as the distance between the stern of the boat and the rearmost point on the keel support structure 120. This is important because the trailer can be backed down a launching ramp until the rearmost part of the keel support structure 120 is in the water and yet the bearings of the wheel are out of the water. The extension of the keel support structure to the rearmost part of the trailer is important because it guides the boat 10 out on to the water off of the frame of the trailer so that the boat does not strike the trailer frame. To this same end, the last roller 124 is at the rearmost part of the keel support structure 120. It will also be noted that the back end of the keel support structure 120 flares out towards each side of the trailer as seen in FIG. 2 and the roller 124 mounted at the back end of the keel support structure 120 is slightly longer than the others. The flared out arrangement of the guide members 121 and 122 is important in that it allows the boat to be easily positioned with the metal strip 10a in between the guide members 121 and 122 during the loading process.

With the structure of the boat trailer in mind consider its operation. During transportation of the boat 10 in the trailer 100, the keel support structure 120 is in a forward position with the rocker arms 130 extending at an angle towards the front of the trailer. This causes the boat to be seated on the pads 116 and the rollers 124 out of contact with the metal strip 10a. Actuation of the hydraulic jack 132 forces the connecting member 134 to push the guide members 121 and 122 towards the rear of the boat. Movement of the members 121 and 122 towards the rear of the boat causes the rocker arms 130 to rotate and raise the rollers 124 against the metal strip 10a and raise the boat 10 in the trailer off of the pads 116. This position of the rollers 124 and the metal strip 10a is illustrated by dashed lines in FIG. 3. The boat 10 is disconnected from the winch 142 and then glides out because of its own weight rolling along on the rollers 124. The guide members 121 and 122 guide the metal strip 10a maintaining the boat in a straight line as it rolls off of the trailer.

During the loading process, the sequence of events are reversed. The boat is brought up to the rear of the trailer, maneuvered so that the metal strip 10a enters the flared back end of the keel support structure 120 and goes in between the guide members 121 and 122. The pilot of the boat drives the boat along the rollers 124. When the boat 10 is in proper position the cable from the winch 142 is connected to the bow of the boat and the boat is pulled into position. The jack 132 is then actuated so that the pressure is released from the jack. This allows the weight of the boat 10 to force the rocker arms 130 downward allowing the members 121 and 122 to move downward until the boat is seated on the pads 116. As the boat is lowered on to the pads 116, the rollers 124 move down out of contact with the metal strip 10a and the weight of the boat on the pads 116 holds the boat in position on the trailer.

What is claimed is:

1. In a trailer for a boat the combination comprising, a rigid frame having front and back ends and sides including a central support structure in between the sides in said frame, an elongated keel support structure extending along said central support structure having a front end terminating towards the front end of said frame and a back end terminating at the back end of said frame, said keel support structure including a pair of parallel members positioned along the length thereof and spaced apart, a series of rollers connected in between said parallel members on which a keel member of a boat mounted in the trailer rolls and including a roller at the back end of said keel support member to guide such a boat off the trailer without striking said frame, a plurality of substantially parallel rocker members rotatably connected between said keel support structure and said central support structure, and means connected between said frame and said keel support member for moving said keel support member relative to said central support structure causing said rocker members to rotate and lift such boat in the trailer and allow same to roll along said rollers off the back end of said frame.

2. In a trailer for a boat the combination comprising, a rigid frame having front and back ends and sides including a central support structure in between the sides in said frame, an elongated keel support structure extending along said central support structure, said keel support structure including a pair of rigid guides extending upward along the length thereof and spaced apart to permit a keel member of a boat mounted in the trailer to extend therein, a series of rollers connected in between said guides on which such keel member rolls and positioned with the outer periphery thereof below the upper side of said guides to allow such keel member to be guided by said guides, a plurality of substantially parallel rocker members rotatably connected between said keel support structure and said central support structure and means connected between said frame and said keel support member for moving said keel support member along said central support structure causing said rocker members to rotate and lift such boat in the trailer and allow same to roll along said rollers off the back end of said frame.

3. In a trailer for a boat the combination comprising, a rigid frame having front and back ends and sides including a central support structure in between the sides in said frame, an elongated keel support structure extending along said central support structure having a front end terminating towards the front end of said frame and a back end terminating at the back end of said frame, said keel support structure including a pair of parallel members positioned along the length thereof and spaced apart, a series of rollers connected in between said parallel members on which a keel member of a boat of predetermined length mounted in the trailer rolls and including a roller at the back end of said keel support member to guide such a boat off the trailer without striking said frame, a plurality of substantially parallel rocker members rotatably connected between said keel support structure and said central support structure, at least one pair of wheels for supporting said frame, a front member connected to said frame and extending upward from said frame to provide a reference position for the stern of such boat, said central support structure extending past the rear of such boat in a rearward direction a substantial distance, and means connected between said frame and said keel support member for moving said keel support member along said central support structure causing said rocker members to rotate and lift such boat in the trailer and allow same to roll along said rollers off the back end of said frame.

4. In a trailer for a boat the combination comprising, a rigid frame having front and back ends and sides including a central support structure extending from a front to a back position in between the sides in said frame, an elongated keel support structure extending along said central support structure, said keel support structure including a pair of rigid guides extending upward along the length thereof and spaced apart to permit a keel member of a boat mounted in the trailer to extend therein, a series of rollers connected in between said guides on which such keel member rolls and positioned with the outer periphery thereof below the upper side of said guides to allow such keel member to be guided by said guides, a plurality of substantially parallel rocker members rotatably connected between said keel support structure and said central support structure, a jack rigidly connected to said frame towards the front of said frame and an elongated connecting member rotatably connected in between said jack and said keel support structure, said jack being oriented such that actuation thereof moves said keel support structure in a rearward direction causing said rocker members to rotate and lift such boat in the trailer and allow same to roll along said rollers off the back end of said frame.

5. In a trailer for a boat the combination comprising, a rigid frame having front and back ends and sides including a central support structure having a recess therein extending from a front to a back position in between the sides in said frame, an elongated keel support structure extending along said recess and having a front end terminating towards the front end of said frame and a back end terminating at the back end of said frame, said keel support structure including a pair of rigid guides extending upward and parallel with the length thereof and spaced apart to permit a keel member of a boat mounted in the trailer to extend therein, the space in between said guides being flared outward at the back end thereof to permit easy loading of a boat in the trailer, a series of rollers connected in between said guides on which such keel member rolls and positioned with the outer periphery thereof below the upper side of said guides to allow such keel member to be guided by said guides, a plurality of substantially parallel rocker members extending out of said recess and rotatably connected between said keel support structure and said central support structure, a jack rigidly connected to said frame towards the front of said frame and an elongated connecting member rotatably connected in between said jack and said keel support structure, said jack being oriented such that actuation thereof moves said keel support structure in a rearward direction causing said rocker members to rotate and lift such boat in the trailer and allow same to roll along said rollers off the back end of said frame.

6. In a trailer for a boat the combination comprising, a rigid frame having front and back ends and sides including a central support structure having a recess therein extending from a front to a back position in between the sides in said frame, an elongated keel support structure extending along said recess and having a front end terminating towards the front end of said frame and a back end terminating at the back end of said frame, said keel support structure including a pair of rigid guides extending upward and parallel with the length thereof and spaced apart to permit a keel member of a boat mounted in the trailer to extend therein, a series of rollers connected in between said guides on which such keel member rolls, including a roller at the back end of said frame, at least some said rollers being positioned with the outer periphery thereof below the upper side of said guides so as to allow such keel member to be guided by said guides, a plurality of substantially parallel rocker members extending out of said recess and rotatably connected between said keel support structure and said central support structure, a jack rigidly connected to said frame towards the front of said frame and an elongated connecting member rotatably connected in between said jack and said keel support structure, said jack and elongated connecting member being oriented with respect to the frame such that actuation of the jack moves said keel support structure in a rearward direction causing said rocker members to rotate and lift such boat in the trailer and allow same to roll along said rollers off the back end of said frame.

7. In a trailer for a boat the combination comprising, a rigid frame having front and back ends and sides including a central support structure having a recess therein extending from a front to a back position in between the sides in said frame, an elongated keel support structure extending along said recess and having a front end terminating towards the front end of said frame and a back end terminating at the back end of said frame, said keel support structure including a pair of rigid guides extending upward and parallel with the length thereof and spaced apart to permit a keel member of a boat mounted in the trailer to extend therein, a series of rollers connected in between said guides on which such keel member rolls and positioned with the outer periphery thereof below the upper side of said guides to allow such keel member to be guided by said guides, a plurality of substantially parallel rocker members extending out of said recess and rotatably connected between said keel support structure and said central support structure, a jack rigidly connected to said frame towards the front of said frame and an elongated connecting member rotatably connected in between said jack and said keel support structure, said jack being oriented such that actuation thereof moves said keel support structure in a rearward direction causing said rocker members to rotate and lift such boat in the trailer and allow same to roll along said rollers off the back end of said frame.

References Cited

UNITED STATES PATENTS

| | | | |
|---|---|---|---|
| 2,524,664 | 10/1950 | Henderson et al. | 214—84 |
| 2,835,401 | 5/1958 | Byrd | 214—84 X |
| 2,840,252 | 6/1958 | Weber | 214—84 |

GERALD M. FORLENZA, *Primary Examiner.*

A. J. MAKAY, *Assistant Examiner.*